(No Model.)

H. C. A. KASSCHAU
FISHING REEL.

No. 285,630. Patented Sept. 25, 1883.

WITNESSES:
Jos. N. Rosenbaum.
Otto Risch.

INVENTOR
Henry C. A. Kasschau
BY Paul Goepel.
ATTORNEY

UNITED STATES PATENT OFFICE.

HENRY C. A. KASSCHAU, OF NEW YORK, N. Y.

FISHING-REEL.

SPECIFICATION forming part of Letters Patent No. 285,630, dated September 25, 1883.

Application filed February 19, 1883. (No model.)

*To all whom it may concern:*

Be it known that I, HENRY C. A. KASSCHAU, of the city, county, and State of New York, have invented certain new and useful Improvements in Fishing-Reels, of which the following is a specification.

This invention has reference to an improved fishing-reel that is used without a rod, and by which the line can be cast to a considerable distance and hauled in with great facility.

The invention consists of a reel supported on a reel-frame having a handle, said reel-frame being provided with a hook-shaped finger-rest.

Figure 1:
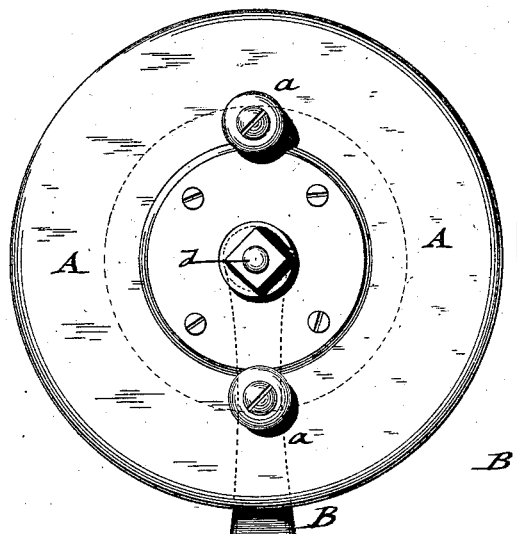
Figure 2:
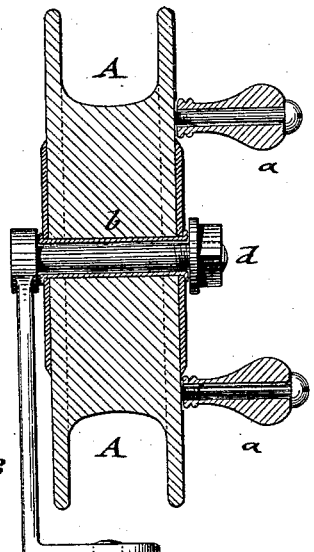
Figure 3:
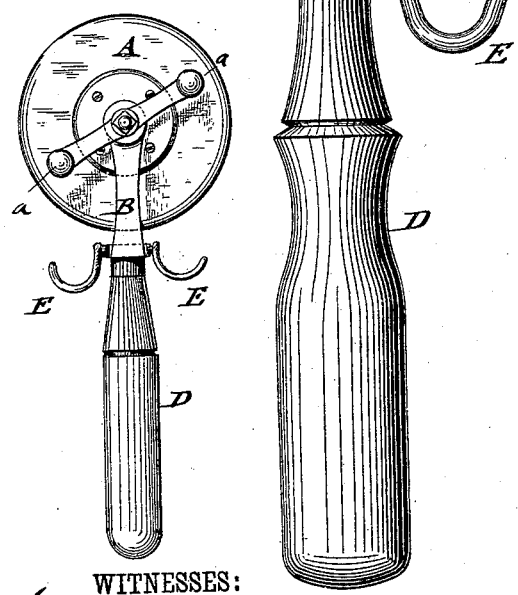
Figure 4:
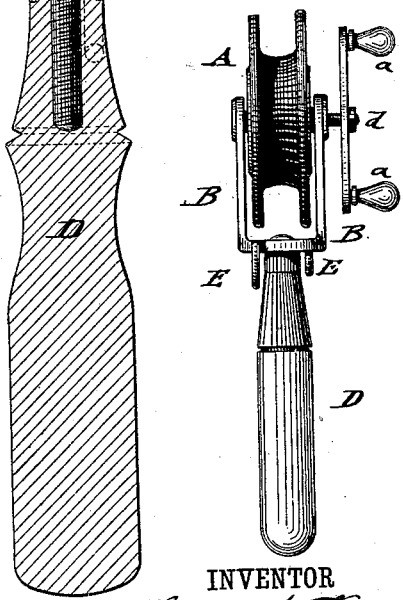

In the accompanying drawings, Figure 1 represents a side view, and Fig. 2 a vertical transverse section, of my improved fishing-reel, and Figs. 3 and 4 are respectively a side and edge view of a modified construction of the same.

Similar letters of reference indicate corresponding parts.

A in the drawings represents a reel of a size large enough to wind up a considerable length of line. The reel A is made either of wood or of a skeleton metal frame, and provided with one or two crank-handles, *a a*, for winding up the line. The reel A revolves either by a metal hub or sleeve, *b*, on a fixed spindle, *d*, of the reel-frame B, as shown in Fig. 2, or it is rigidly applied to the spindle *d*, which revolves then in bearings of the reel-frame B, as shown in Fig. 4.

The reel-frame B may be made either of a single post, that is rigidly secured to the handle, or of fork shape, the spindle being in one case fixed to and in the other case revoluble in the reel-frame. When the frame B is fork-shaped, the crank-handles *a a*, for revolving the reel, are arranged outside of the frame B, and are secured to the spindle, as shown in Fig. 4.

The reel-frame B is provided at its point of the attachment to the handle D at one or at both sides with a hook-shaped finger-rest, E, which is either cast in one piece with the reel-frame B or attached in any suitable manner thereto. The finger-rest E is taken hold of by the forefinger, while the remaining fingers grasp the handle. If the reel-frame is provided with two finger-rests, E, the reel can be used with the right or left hand, as desired. By the finger-rest the reel can be firmly grasped and then the line thrown with considerable force to a great distance from the shore without any danger of slipping out of the hand.

My improved reel can be used for fishing without a rod, while it still furnishes all the facilities of winding up and casting out the line. If desired to be used with the rod, the reel may be removed from the spindle and applied by the usual spindle attachment to a fishing-rod.

Having thus described my invention, I claim as new and desire to secure by Letters Patent—

A hand fishing-reel consisting of a revolving reel, A, reel-frame B, handle D, and hook-shaped finger-rest E at the base of the reel-frame, substantially as set forth.

In testimony that I claim the foregoing as my invention I have signed my name in presence of two subscribing witnesses.

HENRY C. A. KASSCHAU.

Witnesses:
PAUL GOEPEL,
SIDNEY MANN.